(12) United States Patent
Faibish et al.

(10) Patent No.: US 9,087,075 B1
(45) Date of Patent: Jul. 21, 2015

(54) STORING FILES IN A PARALLEL COMPUTING SYSTEM USING LIST-BASED INDEX TO IDENTIFY REPLICA FILES

(75) Inventors: Sorin Faibish, Newton, MA (US); John M. Bent, Los Alamos, NM (US); Percy Tzelnic, Concord, MA (US); Zhenhua Zhang, Beijing (CN); Gary Grider, Los Alamos, NM (US)

(73) Assignees: EMC Corporation, Hopkinton, MA (US); Los Alamos National Security, LLC, Los Alamos, NM (US)

( * ) Notice: Subject to any disclaimer, the term of this patent is extended or adjusted under 35 U.S.C. 154(b) by 195 days.

(21) Appl. No.: 13/536,331

(22) Filed: Jun. 28, 2012

(51) Int. Cl.
 *G06F 17/30* (2006.01)

(52) U.S. Cl.
 CPC ............................. *G06F 17/30212* (2013.01)

(58) Field of Classification Search
 None
 See application file for complete search history.

(56) References Cited

U.S. PATENT DOCUMENTS

| | | | |
|---|---|---|---|
| 6,098,074 A * | 8/2000 | Cannon et al. ...................... 1/1 |
| 7,065,618 B1 * | 6/2006 | Ghemawat et al. ............ 711/161 |
| 7,873,782 B2 | 1/2011 | Terry et al. |
| 7,996,361 B1 * | 8/2011 | Shah et al. .................... 707/626 |
| 8,352,429 B1 * | 1/2013 | Mamidi et al. ................ 707/640 |
| 2005/0015431 A1 * | 1/2005 | Cherkasova .................... 709/201 |
| 2006/0101025 A1 * | 5/2006 | Tichy et al. .................... 707/100 |
| 2007/0043789 A1 * | 2/2007 | Cannon et al. ................ 707/203 |

OTHER PUBLICATIONS

Author: Hong Tangx, Aziz Gulbedeny, Jingyu Zhouy, William Strathearny, Tao Yangxy, and Lingkun Chux fhtang,, gulbeden, jzhou, bill tyang, lkchug@cs.ucsb.edu; Title: "A Self-Organizing Storage Cluster for Parallel Data-Intensive Applications", Date: year 2004; Publisher: IEEE; Pertinent Pages: whole document (13 pages as attached pdf).*
Bent et al., PLFS: A Checkpoint Filesystem for Parallel Applications, International Conference for High Performance Computing, Networking, Storage and Analysis 2009 (SC09), Nov. 2009.
EMC Fast Cache, http://www.emc.com/collateral/software/white-papers/h8046-clariion-celerra-unified-fast-cache-wp.pdf, Oct. 2011.

* cited by examiner

Primary Examiner — Anh Tai Tran
(74) Attorney, Agent, or Firm — Ryan, Mason & Lewis, LLP

(57) ABSTRACT

Improved techniques are provided for storing files in a parallel computing system using a list-based index to identify file replicas. A file and at least one replica of the file are stored in one or more storage nodes of the parallel computing system. An index for the file comprises at least one list comprising a pointer to a storage location of the file and a storage location of the at least one replica of the file. The file comprises one or more of a complete file and one or more sub-files. The index may also comprise a checksum value for one or more of the file and the replica(s) of the file. The checksum value can be evaluated to validate the file and/or the file replica(s). A query can be processed using the list.

26 Claims, 2 Drawing Sheets

STORING FILES IN A PARALLEL COMPUTING SYSTEM USING LIST-BASED INDEX TO IDENTIFY REPLICA FILES

STATEMENT OF GOVERNMENT RIGHTS

This invention was made under a Cooperative Research and Development Agreement between EMC Corporation and Los Alamos National Security, LLC. The United States government has rights in this invention pursuant to Contract No. DE-AC52-06NA25396 between the United States Department of Energy and Los Alamos National Security, LLC for the operation of Los Alamos National Laboratory.

FIELD

The present invention relates to parallel storage in high performance computing environments.

BACKGROUND

Parallel storage systems are widely used in many computing environments. Parallel storage systems provide high degrees of concurrency in which many distributed processes within a parallel application simultaneously access a shared file namespace.

Parallel computing techniques are used in many industries and applications for implementing computationally intensive models or simulations. For example, the Department of Energy uses a large number of distributed compute nodes tightly coupled into a supercomputer to model physics experiments. In the oil and gas industry, parallel computing techniques are often used for computing geological models that help predict the location of natural resources. One particular parallel computing application models the flow of electrons within a cube of virtual space by dividing the cube into smaller sub-cubes and then assigning each sub-cube to a corresponding process executing on a compute node.

Storage systems typically use data replication to store the same data on multiple storage devices to improve reliability, fault-tolerance and/or accessibility. Existing storage systems allow multiple copies of the same data to be stored, but all replica copies are stored using the same type of storage. Storage tiering techniques are increasingly used in parallel computing environments to more efficiently store the vast amounts of information. For example, the Symmetrix™ system from EMC Corporation is an enterprise storage array that optionally includes Fully Automated Storage Tiering (FAST). Storage tiering techniques typically combine Non-Volatile Random Access Memory (NVRAM), also referred to as flash memory, with more traditional hard disk drives (HDDs). Flash memory is used to satisfy the bandwidth requirements of a given system while the hard disk drives are used to satisfy the capacity requirements.

A need therefore exists for improved techniques for storing replica copies in a hierarchical storage tiering system.

SUMMARY

Embodiments of the present invention provide improved techniques for storing files in a parallel computing system using a list-based index to identify file replicas. In one embodiment, a method is provided for storing at least one file generated by a distributed application in a parallel computing system, wherein the file comprises one or more of a complete file and a sub-file. The method comprises the steps of generating at least one replica of the file; storing the file and the at least one replica of the file in one or more storage nodes of the parallel computing system; and updating an index for the file, the index comprising at least one list comprising a pointer to a storage location of the file and a storage location of the at least one replica of the file.

In one exemplary embodiment, the pointer to a storage location of the file comprises a pointer to a first physical file storing the file and wherein the pointer to a storage location of the at least one replica of the file comprises a pointer to a second physical file storing the at least one replica of the file. In addition, the index optionally further comprises a list comprising a first offset for the file within the first physical file and a second offset for the at least one replica of the file within the second physical file; and a logical offset for the file and a length of the file.

According to a further aspect of the invention, the index may also comprise a checksum value for one or more of the file and the at least one replica of the file. The checksum value can be evaluated to validate one or more of the file and the at least one replica of the file. According to another aspect of the invention, a query can be processed using the list.

Advantageously, illustrative embodiments of the invention provide techniques for storing files in a parallel computing system using a list-based index to identify file replicas. The list-based index permits the files and file replicas to be stored with reduced data processing and transfer bandwidth costs, and preserves valuable disk space.

These and other features and advantages of the present invention will become more readily apparent from the accompanying drawings and the following detailed description.

DETAILED DESCRIPTION

The present invention provides improved techniques for storing replica copies of a file in a hierarchical storage tiering system. Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "files" shall include complete files and portions of files, such as sub-files or shards.

According to one aspect of the invention, a file generated by a distributed application in a parallel computing system is stored with one or more replicas of the file on one or more storage nodes of the parallel computing system. An index for the file is maintained with at least one list comprising a pointer to a storage location of the file and a pointer to a storage location of the replica(s) of the file.

According to a further aspect of the invention, the maintained index further comprises a checksum value for the file and/or the file replica(s). In this manner, the checksum value can be evaluated to validate the file and/or the file replica(s). In a further variation, the checksum value can be evaluated for the file and at least one replica of the file to provide an uncorrupted version of the file.

Storage tiering techniques are increasingly used in parallel computing environments to more efficiently store the vast amounts of information. For example, the Symmetrix system from EMC Corporation is an enterprise storage array that optionally includes Fully Automated Storage Tiering (FAST). Storage tiering techniques typically combine Non-Volatile Random Access Memory (NVRAM), also referred to as flash memory, with more traditional hard disk drives (HDDs). Flash memory is used to satisfy the bandwidth requirements of a given system while the hard disk drives are used to satisfy the capacity requirements.

Figure 1:
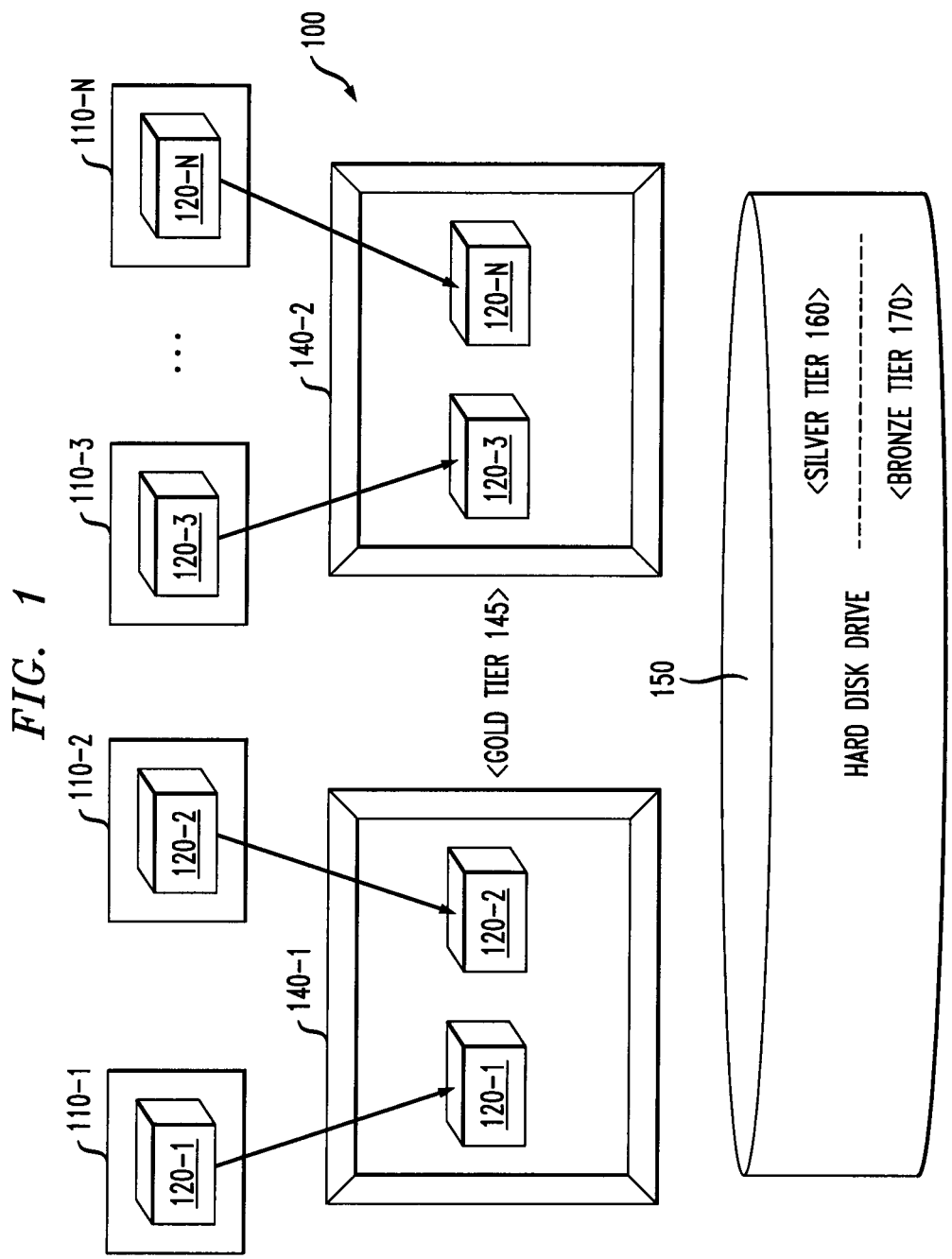
FIG. 1 illustrates an exemplary hierarchical storage tiering system that incorporates aspects of the present invention.

FIG. 1 illustrates an exemplary hierarchical storage tiering system 100 that incorporates aspects of the present invention. As shown in FIG. 1, the hierarchical storage tiering system 100 comprises a plurality of compute nodes 110-1 through 110-N (collectively, compute nodes 110) each having a portion 120-1 through 120-N of a distributed data structure or other information to store. For example, four compute nodes 110-1 through 110-4 can each process climate data for a different quadrant of a country, such as northeast, northwest, southeast and southwest quadrants. The compute nodes 110 optionally store the portions 120 of the distributed data structure in one or more nodes of the exemplary hierarchical storage tiering system 100, such as two exemplary flash based storage nodes 140-1, 140-2 (e.g., burst buffer nodes). The tier containing the burst buffer nodes 140-1, 140-2 may be referred to, for example, as a Gold Tier 145.

In addition, the exemplary hierarchical storage tiering system 100 optionally comprises one or more hard disk drives 150. The tier containing the hard disk drives 150 may be further divided, for example, into a Silver Tier 160 and a Bronze Tier 170. In one variation, the Bronze Tier 170 may be implemented, for example, using an optional tier of slower tape memory (not shown in FIG. 1). The tiers 145, 160, 170 may optionally be described by standard gold, silver, and bronze designations and may be differentiated by different bandwidths, different latencies, different reliabilities, and different capacities, in a known manner.

According to one aspect of the present invention, one or more nodes in the exemplary hierarchical storage tiering system 100, such as the compute nodes 110, the flash based storage nodes 140-1, 140-2 and the hard disk drives 150, generate one or more replicas of a file. As discussed further below in conjunction with FIG. 2, an index 200 is maintained to record the location of the file and the corresponding file replicas. The index can be maintained by, for example, a processor, a microprocessor, a microcontroller, an application-specific integrated circuit (ASIC), a field-programmable gate array (FPGA) or other type of processing circuitry, as well as portions or combinations of such circuitry elements.

According to a further aspect of the invention, the file and the corresponding file replicas can be selectively stored on one or more of the flash based storage nodes 140-1, 140-2 and/or a hard disk drive (HDD) 150 (e.g., a parallel file system) based on automated tiering, or an application or user specification of how to store files in the exemplary hierarchical storage tiering system 100. Note that the burst buffers 140 might be an explicit delineated storage tier 145, as shown in FIG. 1, or they might be a fast buffer within another storage tier (for example, it could be memory on a compute node 140 or memory within the storage array 150).

PLFS can make the placement decision automatically, as described herein, or it can be explicitly controlled by the application and administered a storage daemon. For a more detailed discussion of storage tiering based on a user or application specification, see, for example, U.S. patent application Ser. No. 13/536,289, entitled "Storing Files in a Parallel Computing System Based on User-Specification," filed contemporaneously herewith and incorporated by reference herein.

In a conventional PLFS implementation, data is first written to the flash based storage nodes 140 (also referred to as Solid State Data (SSD) nodes), and is then copied to the parallel file system 150. The data is removed from the flash based storage nodes 140 when capacity is needed. Aspects of the present invention extend the notion of a fast tier to include memory buffers and to include a deeper tiering which extends into the storage array itself. The full stack of tiers may be any subset, or the complete set, of: memory on the compute node 110, memory in a flash based storage node 140, solid state devices in a flash based storage node 140, or memory, SSD, fast disk, slow disk in a storage array, and a tape system.

The present invention recognizes that such storage tiering provides a new opportunity for replication, for example, in one or more of the compute nodes 110, the flash based storage nodes 140-1, 140-2 and the hard disk drives 150, to selectively store and remove the replicated data.

In one exemplary embodiment, the middleware file system that processes the data blocks as they are written into the flash based storage nodes is implemented using the Fully Automated Storage Tiering (FAST) system of EMC Corporation and the Parallel Log-Structured File System (PLFS), as modified herein to provide the features and functions of the present invention. See, for example, "EMC FAST Cache," http://www.emc.com/collateral/software/white-papers/h8046-clariion-celerra-unified-fast-cache-wp.pdf, or John Bent et al., "PLFS: A Checkpoint Filesystem for Parallel Applications," Intl Conf. for High Performance Computing, Networking, Storage and Analysis 2009 (SC09) (Nov. 2009), each incorporated by reference herein. Generally, conventional PLFS improves the efficiency of checkpoint techniques for parallel applications by inserting an interposition layer into the existing storage stack to rearrange the problematic access pattern associated with checkpoints.

Figure 2:
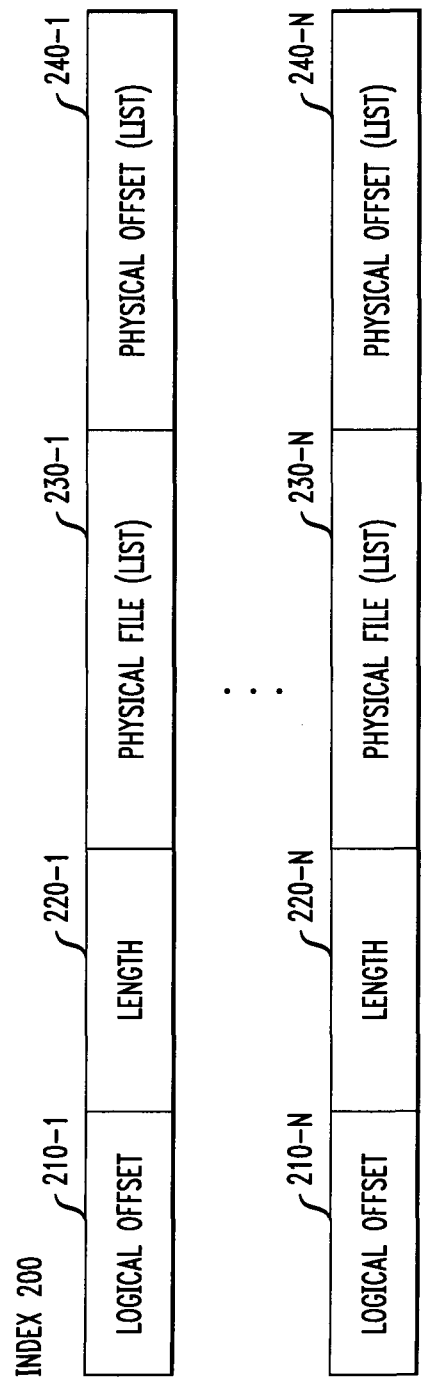
FIG. 2 illustrates an exemplary index in accordance with the present invention.

FIG. 2 illustrates an exemplary index 200 in accordance with the present invention. Generally, the index 200 is maintained by PLFS to determine the location of data being retrieved. As shown in FIG. 2, the exemplary index 200 comprises a plurality of entries, with each entry comprising a logical offset 210, a length 220, a physical file 230 and a physical offset 240. In accordance with the present invention, the physical file 230 and the physical offset 240 are lists.

The logical offset 210 comprises an offset value for a sub-file. The length 220 indicates the length of the sub-file. The physical file list 230 comprises a pointer to where each physical sub-file is stored. The physical offset 240 indicates where each sub-file is stored within the corresponding physical file.

As previously indicated, the index 200 optionally further comprises a checksum value (not shown in FIG. 2) for the file and/or the file replica(s) to assist data integrity, data corruption, and data recoverability.

Replication in accordance with the present invention permits a faster restart. If a compute node 110 fails and the application must restart from the last checkpoint, then the restart will be faster since the last checkpoint can be obtained from the fast burst buffer (gold) layer 145.

When an application has been suspended and the last checkpoint is no longer on the burst buffer tier 145 and the application will resume, the job scheduler can instruct PLFS to pre-load the last checkpoint into the fast burst buffer layer 145 so that the restart is faster. This requires job scheduler integration but it is transparent to the application except that the application might notice faster performance.

If a compute node 110 and a burst buffer node 140 both fail at the same time, then the replicated blocks can still be used for fast restart, in two different ways. First, some blocks that are only replicated to the slower disk based storage system 150 will have to be re-fetched from the disk based storage system 150. However, the restart will still be faster since most of the blocks will be fetched from the fast burst buffers 140 and only those blocks from the single failed burst buffer 140 will need to be re-fetched more slowly from the hard disk drive layer 150. Second, some blocks might be replicated across multiple burst buffers 140 so they can then be re-fetched quickly.

According to another aspect of the invention, replicated blocks can be used to ensure data integrity by comparing the contents. If two replicated blocks do not match, the data has been corrupted. The checksums in the entries of the index 200 can be employed to detect data corruption. If the block is replicated, then the corrupted block can be re-copied from the replicated block.

The parallel system of the present invention can be used to check the checksum of each replica in parallel when a file is read to ensure that the application gets the correct uncorrupted data.

According to another aspect of the invention, replicated blocks can be used in a burst buffer system 140 to improve data analysis. When analysis runs on the burst buffer 140 (or another node in the system 100), there are two ways that replicated blocks can improve performance. First, the replication can provide access to the nearest copy (in a similar manner to existing Map-Reduce techniques). The replicas can be positioned nearby using job scheduler integration, in a similar manner to the restart. In addition, the semantics associated with each sub-file can be used to replicate data not on file offset delimiters but on semantically meaningful boundaries such as sub-cells within a distributed multidimensional array. In this manner, the analysis can operate on the semantic divisions so data locality will be easier to predict, to ensure, and to exploit. For a more detailed discussion of storage tiering based on a user or application specification, see, for example, U.S. Pat. No. 8,949,255, entitled "Methods and Apparatus for Capture and Storage of Semantic Information with Sub-Files In a Parallel Computing System,", filed contemporaneously herewith and incorporated by reference herein.

Among other benefits, the replicated blocks in accordance with the present invention can be used to speed up a job restart; to assist analysis, data resilience and data integrity; and to automatically migrate data without application explicit control. In addition, the specification of how and where a given file is stored can be scheduled according to a policy, for example, where a visualization analysis routine is requested to retain uncompressed data for a certain time.

Because PLFS files can be shared across many locations, data movement required to implement these functions can be performed more efficiently when there are multiple nodes cooperating on the data movement operations. Therefore, when this is run on a parallel system with a parallel language, such as MPI, PLFS can provide MPI versions of these functions which will allow it to exploit parallelism for more efficient data manipulation.

Among other benefits, the application does not have to consider the location of the replicas and as such replica location is transparent to the application.

CONCLUSION

Numerous other arrangements of servers, computers, storage devices or other components are possible. Such components can communicate with other elements over any type of network, such as a wide area network (WAN), a local area network (LAN), a satellite network, a telephone or cable network, or various portions or combinations of these and other types of networks.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method performed by a middleware process for storing at least one sub-file generated by a distributed application in a parallel computing system, wherein said sub-file comprises a portion of a larger file, said method comprising the steps of:
   generating at least one replica of said sub-file;
   storing said sub-file and said at least one replica of said sub-file in one or more storage nodes of said parallel computing system; and
   updating an index for said sub-file using said middleware process, said index comprising a length of said sub-file, a first list comprising a pointer to a storage location of said sub-file and a pointer to a storage location of said at least one replica of said sub-file and a second list comprising a first offset for said sub-file within a first physical file storing said file and a second offset for said at least one replica of said sub-file within a second physical file storing at least one replica of said file.

2. The method of claim 1, wherein said pointer to a storage location of said sub-file comprises a pointer to said first physical file storing said sub-file and wherein said pointer to said storage location of said at least one replica of said sub-file comprises a pointer to said second physical file storing said at least one replica of said sub-file.

3. The method of claim 2, wherein said index further comprises said second list comprising said first offset for said file within said first physical file and said second offset for said at least one replica of said file within said second physical file.

4. The method of claim 1, wherein said index further comprises a logical offset for said sub-file.

5. The method of claim 1, wherein said index further comprises a checksum value for one or more of said sub-file and said at least one replica of said sub-file.

6. The method of claim 5, further comprising the step of evaluating said checksum value to validate one or more of said sub-file and said at least one replica of said sub-file.

7. The method of claim 1, further comprising the step of reloading one or more of said sub-file and said at least one replica of said sub-file using one or more of said first list and said second list.

8. The method of claim 1, further comprising the step of delivering one of said sub-file and said at least one replica of said sub-file based on a determination of a nearest copy from one or more of said first list and said second list.

9. The method of claim 1, wherein a replication strategy can be separately specified for each of a plurality of said sub-files.

10. The method of claim 1, further comprising the step of processing a query using one or more of said first list and said second list.

11. The method of claim 1, wherein said one or more of said storage nodes reside on one or more tiers of a multi-tier storage system.

12. An apparatus for storing at least one sub-file generated by a distributed application in a parallel computing system, wherein said sub-file comprises a portion of a larger file, said apparatus comprising:
a memory; and
at least one hardware device operatively coupled to the memory and configured to implement a middleware process that performs the following steps:
generating at least one replica of said sub-file;
storing said sub-file and said at least one replica of said sub-file in one or more storage nodes of said parallel computing system; and
updating an index for said sub-file using said middleware process, said index comprising a length of said sub-file, a first list comprising a pointer to a storage location of said sub-file and a pointer to a storage location of said at least one replica of said sub-file and a second list comprising a first offset for said sub-file within a first physical file storing said file and a second offset for said at least one replica of said sub-file within a second physical file storing at least one replica of said file.

13. The apparatus of claim 12, wherein said pointer to a storage location of said sub-file comprises a pointer to said first physical file storing said sub-file and wherein said pointer to said storage location of said at least one replica of said sub-file comprises a pointer to said second physical file storing said at least one replica of said sub-file.

14. The apparatus of claim 13, wherein said index further comprises said second list comprising said first offset for said file within said first physical file and said second offset for said at least one replica of said file within said second physical file.

15. The apparatus of claim 12, wherein said index further comprises a logical offset for said sub-file.

16. The apparatus of claim 12, wherein said index further comprises a checksum value for one or more of said sub-file and said at least one replica of said sub-file.

17. The apparatus of claim 16, wherein said at least one hardware device is further configured to evaluate said checksum value to validate one or more of said sub-file and said at least one replica of said sub-file.

18. The apparatus of claim 12, wherein said at least one hardware device is further configured to reload one or more of said sub-file and said at least one replica of said sub-file using one or more of said first list and said second list.

19. The apparatus of claim 12, wherein said at least one hardware device is further configured to deliver one of said sub-file and said at least one replica of said sub-file based on a determination of a nearest copy from one or more of said first list and said second list.

20. The apparatus of claim 12, wherein a replication strategy can be separately specified for each of a plurality of said sub-files.

21. The apparatus of claim 12, wherein said at least one hardware device is further configured to process a query using one or more of said first list and said second list.

22. The apparatus of claim 12, wherein said one or more of said storage nodes reside on one or more tiers of a multi-tier storage system.

23. A data storage system for storing at least one sub-file generated by a distributed application in a parallel computing system, wherein said sub-file comprises a portion of a larger file, said data storage system comprising:
a hardware processing unit for implementing a middleware process that performs the following steps:
generating at least one replica of said sub-file; and
updating an index for said sub-file, said index comprising a length of said sub-file, a first list comprising a pointer to a storage location of said sub-file and a pointer to a storage location of said at least one replica of said sub-file and a second list comprising a first offset for said sub-file within a first physical file storing said file and a second offset for said at least one replica of said sub-file within a second physical file storing at least one replica of said file; and
a storage medium for storing said sub-file and said at least one replica of said sub-file in one or more storage nodes of said parallel computing system.

24. The data storage system of claim 23, wherein said pointer to a storage location of said sub-file comprises a pointer to said first physical file storing said sub-file and wherein said pointer to said storage location of said at least one replica of said sub-file comprises a pointer to said second physical file storing said at least one replica of said sub-file and wherein said index further comprises said second list comprising said first offset for said file within said first physical file and said second offset for said at least one replica of said file within said second physical file.

25. The data storage system of claim 23, wherein said index further comprises a checksum value for one or more of said sub-file and said at least one replica of said sub-file.

26. The data storage system of claim 23, wherein said processing unit is further configured to evaluate said checksum value to validate one or more of said sub-file and said at least one replica of said sub-file.

\* \* \* \* \*

UNITED STATES PATENT AND TRADEMARK OFFICE
CERTIFICATE OF CORRECTION

| | | |
|---|---|---|
| PATENT NO. | : 9,087,075 B1 | Page 1 of 1 |
| APPLICATION NO. | : 13/536331 | |
| DATED | : July 21, 2015 | |
| INVENTOR(S) | : Sorin Faibish et al. | |

It is certified that error appears in the above-identified patent and that said Letters Patent is hereby corrected as shown below:

Specification

In column 3, line 8, replace "Symmetrix" with --Symmetrix™--.

Claims

In column 8, claim 23, line 24, delete "and" after "said sub-file;".

Signed and Sealed this
Fifth Day of April, 2016

Michelle K. Lee
*Director of the United States Patent and Trademark Office*